United States Patent

Suita et al.

[11] Patent Number: 5,990,442
[45] Date of Patent: Nov. 23, 1999

[54] WELDING GUN

[75] Inventors: Kazutsugu Suita; Seiji Suzuki, both of Toyota; Yoshitaka Sakamoto, Nagoya, all of Japan

[73] Assignee: Toyota Jidosha Kabushiki Kaisha, Toyota, Japan

[21] Appl. No.: 08/948,023

[22] Filed: Oct. 9, 1997

[30] Foreign Application Priority Data

Oct. 28, 1996 [JP] Japan .................................. 8-285421

[51] Int. Cl.⁶ .................................................. B23K 11/30
[52] U.S. Cl. ........................................... 219/86.25; 219/87
[58] Field of Search ............................... 219/86.1, 86.25, 219/86.32, 86.33, 87, 90, 119

[56] References Cited

U.S. PATENT DOCUMENTS

| 2,305,774 | 12/1942 | Hagedorn . | |
|---|---|---|---|
| 2,313,789 | 3/1943 | Weightman | 219/86.25 |
| 3,148,264 | 9/1964 | Van Alan et al. . | |
| 3,665,148 | 5/1972 | Yasenchak et al. | 219/86.33 X |
| 5,111,019 | 5/1992 | Torii et al. | 219/87 |

FOREIGN PATENT DOCUMENTS

| 59-13582 | 1/1984 | Japan . | |
|---|---|---|---|
| 4-253576 | 9/1992 | Japan . | |
| 7-290251 | 11/1995 | Japan . | |
| 2231522 | 11/1990 | United Kingdom | 219/86.25 |

OTHER PUBLICATIONS

Patent Abstracts of Japan, vol. 8, No. 100, May 11, 1984 & JP 59 013582 A (Nissan Jidosha K.K.), Jan. 24, 1984.

*Primary Examiner*—Gregory Mills
*Attorney, Agent, or Firm*—Kenyon & Kenyon

[57] ABSTRACT

A welding gun includes an actuator and welding tips. The actuator includes a stator coupled to a welding robot and a rotor rotatable relative to the stator about an axis of the actuator. The stator includes an axially extending portion and at least one circumferentially extending arm. The rotor includes an axially extending portion and at least one circumferentially extending arm. The welding tips are coupled to an end of the circumferentially extending arm of the stator and an end of the circumferentially extending arm of the rotor. Lengths of the axially extending portion of the stator and the axially extending portion of the rotor can be determined to any length so long as strength and rigidity are assured.

8 Claims, 6 Drawing Sheets

FULL CLOSED    HALF OPEN    FULL OPEN

WELDING GUN

BACKGROUND OF THE INVENTION

1. Field of the Invention

The present invention relates generally to a welding gun, and more particularly, to a welding gun supported by a robot.

2. Description of Related Art

Conventional welding guns are grouped into X-type (for example, disclosed in Japanese Patent Publication No. HEI 4-253576) and C-type.

In the X-type welding gun, as illustrated in FIG. 16, welding tips 4 and 5 are coupled to first ends 2A and 3A of two arms 2 and 3 which are pivotally coupled to each other at a connecting point 1, and a distance between second ends 2B and 3B of the two arms 2 and 3 is changed by an actuator 6 so that the welding gun is opened and closed. In the C-type welding gun, as illustrated in FIG. 17, welding tips 8 and 9 are coupled to opposite ends of a C-type frame, and a distance between the welding tips 8 and 9 is changed by an actuator 10 so that the welding gun is opened and closed.

However, because the welding tips of conventional welding guns move on a straight line, the arms and frame tend to interfere with a workpiece. This is illustrated in FIGS. 14 and 15 in which the interference is denoted by letter A. As a result, operation of the welding gun tends to be restricted. A maximum opening amount $X_1$ of the welding tips and a protruding amount $X_4$ of the welding tips from the body of the welding gun illustrated in FIGS. 16 and 17 tend to be restricted, so that the freedom in designing the welding gun is small.

SUMMARY OF THE INVENTION

An object of the present invention is to provide a welding gun with reduced restrictions on both the movement amount of the welding tips and the configuration and dimensions of the welding gun.

A welding gun according to the present invention includes an actuator and welding tips. The actuator has an axis and includes a stator and a rotor rotatable about the axis of the actuator relative to the stator. The welding tips include at least one first welding tip supported by the stator and at least one second welding tip supported by the rotor. The first welding tip and the second welding tip are arranged on a common circle having a center on the axis of the actuator.

The welding gun is coupled to a robot so that the stator is driven by the robot to rotate about the axis of the actuator.

Both the stator and the rotor are adjustable in rotational angle about the axis of the actuator.

The welding gun further includes an electric circuit for welding, with electric current electrically connected to the first welding tip and the second welding tip. The electric circuit includes an electric switch that is turned on and off according to rotation of the rotor relative to the stator.

The stator includes at least one circumferentially extending arm having a circumferential end. The at least one first welding tip is coupled to the circumferential end of the at least one circumferentially extending arm of the stator, respectively. Similarly, the rotor includes at least one circumferentially extending arm, each circumferentially extending arm having a circumferential end. The at least one second welding tip is coupled to the circumferential end of the at least one circumferentially extending arm of the rotor, respectively.

Two first welding tips and two circumferentially extending arns of the stator may be provided. The two circumferentially extending arms of the stator extend in opposite directions to each other and include circumferential ends. Each of the two first welding tips is coupled to each of the circumferential ends of the two circumferentially extending arms of the stator, respectively. Similarly, two second welding tips and two circumferentially extending arms of the rotor may be provided. The two circumferentially extending arms of the rotor extend in opposite directions to each other and include circumferential ends. Each of the two second welding tips is coupled to each of the circumferential ends of the two circumferentially extending arms of the rotor, respectively.

The two circumferentially extending arms of the stator may be different from each other in length and the two circumferentially extending arms of the rotor may be different from each other in length.

The two first welding tips may be different from each other in configuration, and the two second welding tips may be different from each other in configuration.

In the above-described welding gun, since the welding tips move in the circumferential direction about the axis of the actuator, the welding tips can be opened and closed without causing an interference with the workpiece according to the configuration of the workpiece. This results in reduced restrictions on both the movement amount of the welding tips and the configuration and the dimension of the welding gun.

In the case in which the rotational angle of the welding tips is adjustable, the opening and closing style of the welding gun may be either the style of the conventional X-type welding gun wherein both the welding tip of the stator and the welding tip of the rotor move relative to the workpiece, or the style of the conventional C-type welding gun wherein either the welding tip of the stator or the welding tip of the rotor moves relative to the workpiece. Both of these configurations results in considerable freedom to open and close the welding gun.

In the case in which the electric switch is provided, since the welding current flows only when the welding tips clamp the workpiece, safety in working is very high.

In the case in which two first welding tips and two second welding tips are provided, the life of the welding gun can be increased to substantially twice that of the case in which only one first welding tip and only one second welding tip are provided. Further, welding at two points is possible at one robot position. As a result, freedom of the welding attitude and the efficiency of welding are increased, and the work-time period is shortened.

In the case in which the two circumferentially extending arms of the stator or the rotor are different from each other in length and in the case in which the two first or second welding tips are different from each other in configuration, different kinds of weldings can be conducted by a single welding gun. As a result, the efficiency of welding is increased, and the work-time period is shortened.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawing, in which.

DETAILED DESCRIPTION OF THE PREFERRED EMBODIMENTS

Figure 8:
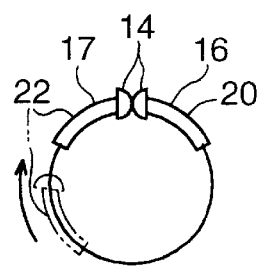
FIG. 8 is a front elevational view of the welding gun of FIG. 6 in a case in which the welding gun is opened and closed by moving only one of the arms, illustrating the movement of the arm of the welding gun.
Figure 9:
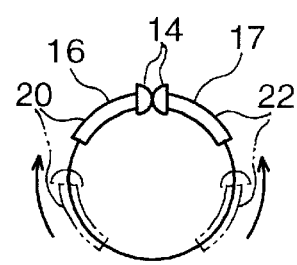
FIG. 9 is a front elevational view of the welding gun of FIG. 6 in a case in which the welding gun is opened and closed by moving both of the arms, illustrating the movement of the arm of the welding gun.
Figure 10:
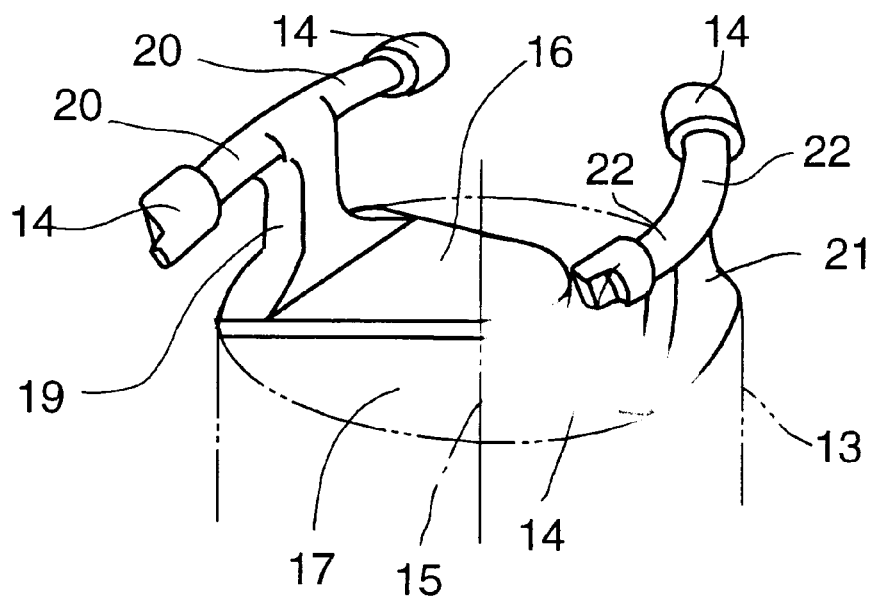
FIG. 10 is an oblique view of a front-end portion of a welding gun according to a second embodiment and a third embodiment of the present invention.
Figure 11:
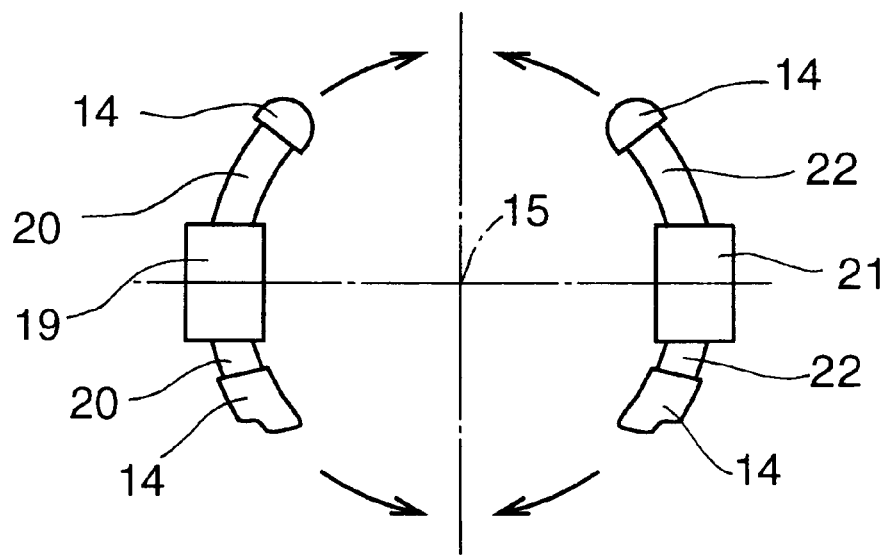
FIG. 11 is a front elevational view of the welding gun of FIG. 10.
Figure 12:
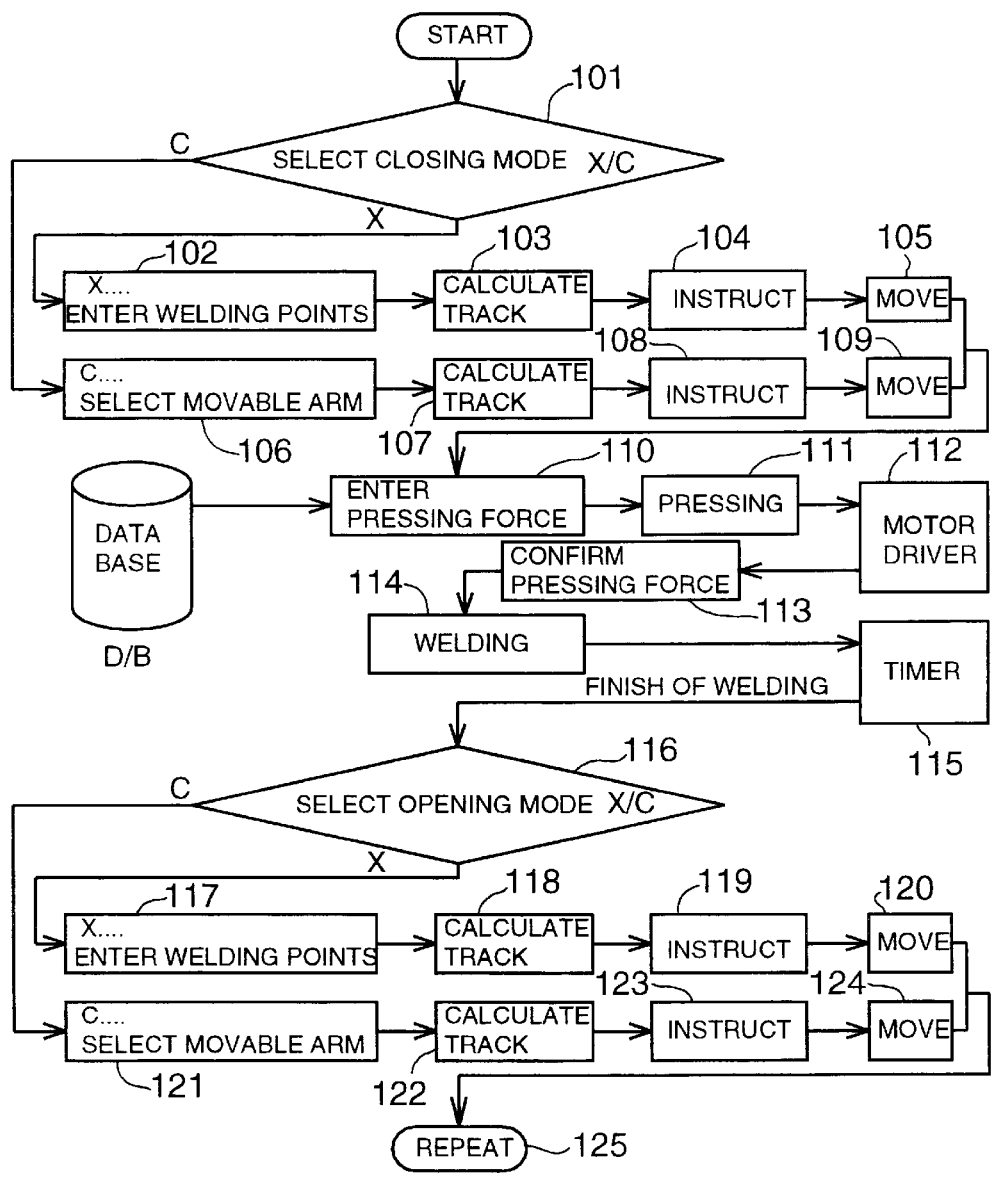
FIG. 12 is a flow chart for operation of the welding gun according to any of the first embodiment, the second embodiment, and the third embodiment of the present invention.

FIGS. 1–9 illustrate a welding gun according to a first embodiment of the present invention, and FIGS. 10 and 11 illustrate a welding gun according to a second embodiment and a welding gun according to a third embodiment of the present invention. FIG. 12 is applicable to any embodiment of the present invention. Portions common or similar to all of the embodiments of the present invention are denoted with the same reference numerals throughout all of the embodiments of the present invention.

First, the portions common or similar to all of the embodiments of the present invention will be explained with reference to, for example, FIGS. 1–9 and FIG. 13.

As illustrated in FIGS. 1–4 and 6, a welding apparatus according to the present invention includes a welding gun 11 and a welding robot 12 (for example, a six-axis robot) supporting the welding gun 11.

The welding gun 11 includes a rotary type actuator 13 (for example, a motor) and a welding tip 14. The actuator 13 has an axis 15. The actuator 13 includes a stator 16 having an axis common to the axis 15 of the actuator and a rotor 17 rotatable about the axis 15 relative to the stator 16. Welding tips 14 are coupled to the stator 16 and the rotor 17. More particularly, at least one first welding tip 14 is coupled to the stator 16, and at least one second welding tip 14 is coupled to the rotor 17. The first welding tip and the second welding tip are positioned on a common circle having a center on the axis 15 of the actuator. Since the rotor 17 is rotatable relative to the stator 16, the second welding tip can move toward and away from the first welding tip in the rotational and reverse directions on that circle.

Figure 1:
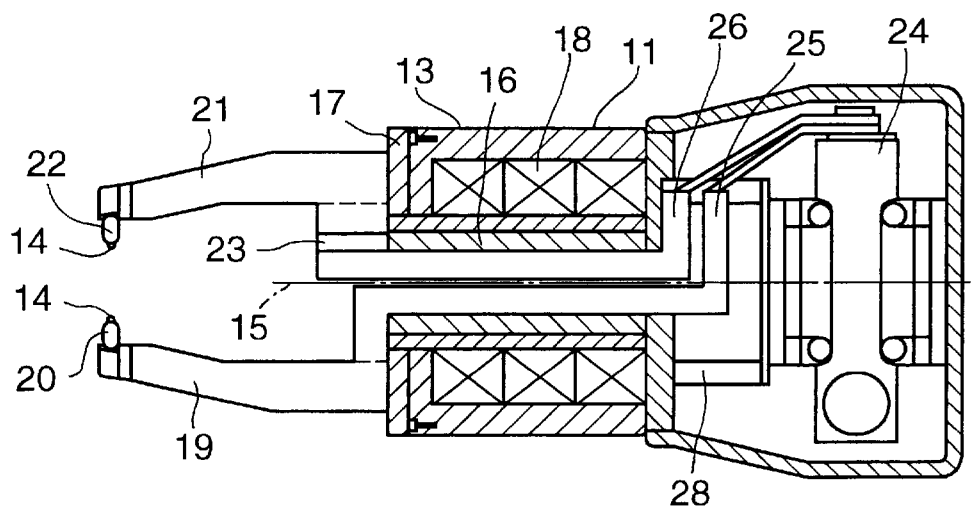
FIG. 1 is a cross-sectional view of a welding gun, in which each of a rotor and a stator has two circumferentially extending arms, according to a first embodiment of the present invention.
Figure 2:
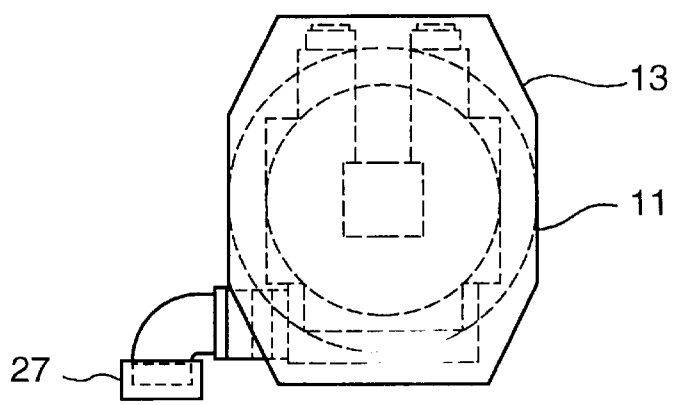
FIG. 2 is a rear elevational view of the welding gun of FIG. 1.
Figure 3:
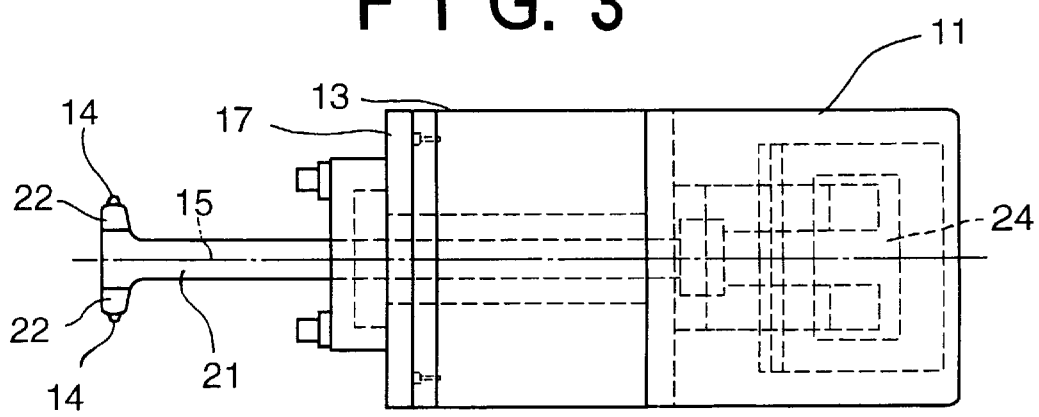
FIG. 3 is a side elevational view of the welding gun of FIG. 1.
Figure 4:
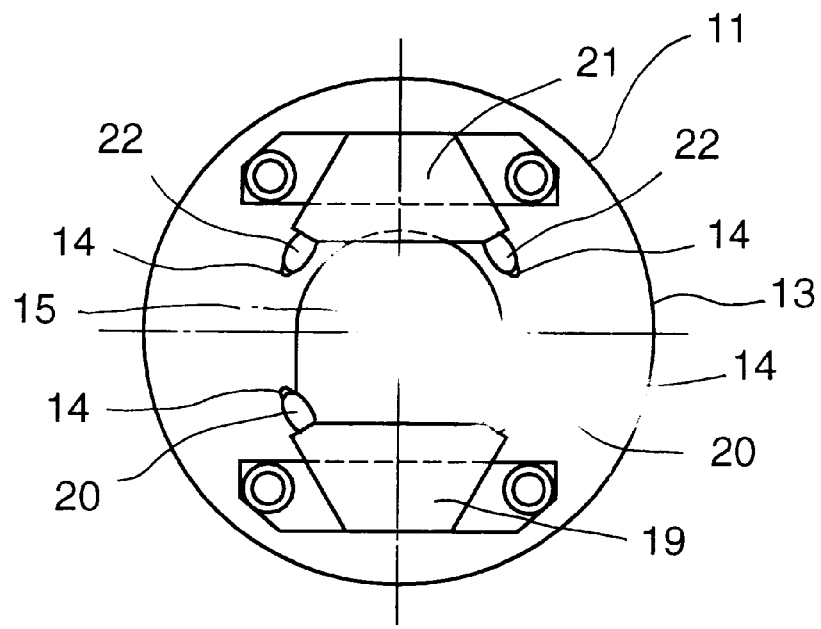
FIG. 4 is a front elevational view of the welding gun of FIG. 1.
Figure 5:
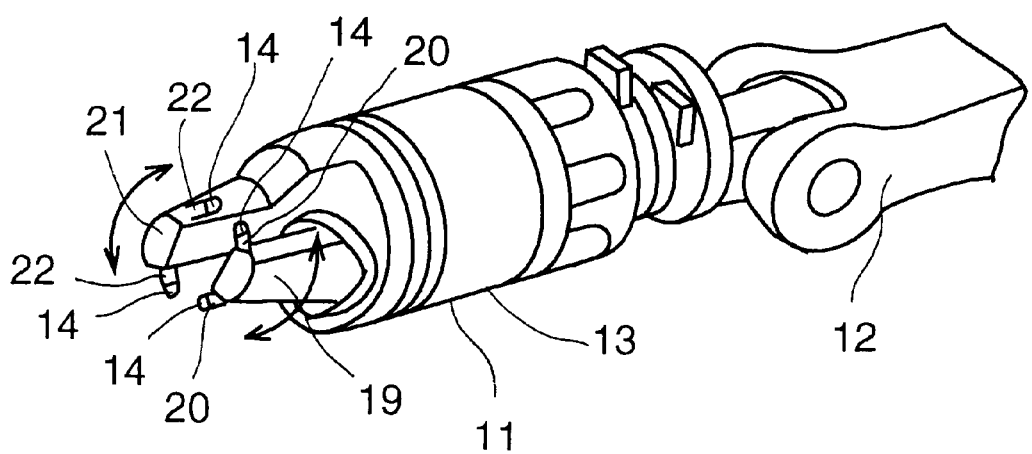
FIG. 5 is an oblique view of the welding gun coupled to a welding robot.
Figure 6:
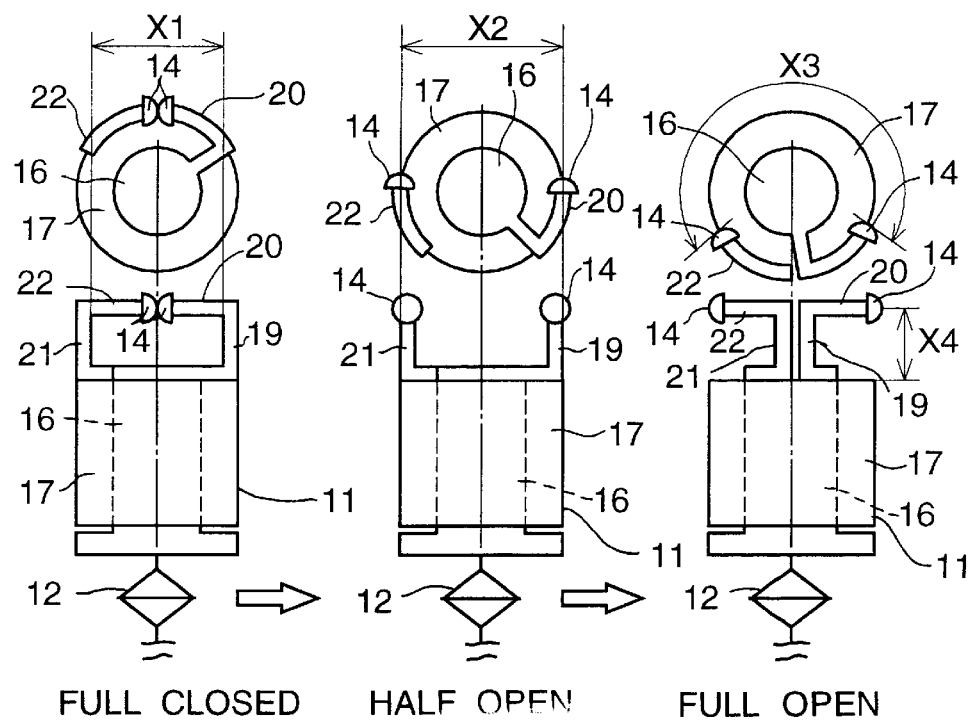
FIG. 6 is a series of front elevational and side elevational views of a welding gun, in which each of a rotor and a stator has one circumferentially extending arm, illustrating a full-closed condition, a half-open condition, and a full-open condition of the welding gun in that order, according to the first embodiment of the present invention.

The welding robot 12 is a six-axis robot, and more particularly, a six-articulation robot. The welding robot 12 has a wrist which has an axis and is rotatable about the axis of the wrist. As illustrated in FIG. 6, the stator 16 is coupled to the wrist of the robot 12 such that the axis 15 of the actuator 13 is coincident with the axis of the wrist of the robot. As a result, the stator 16 is rotated about the axis 15 of the actuator by the robot 12. Since the rotor 17 is rotatable relative to the stator 16, both the stator 16 and the rotor 17 are rotatable about the axis 15 of the actuator. As a result, one of the welding tip 14 of the rotor 17 and the welding tip 14 of the stator 16 can move toward and away from the other on the rotational and reverse directions on the common circle.

FIGS. 1–4 illustrate the structure of the welding gun. The rotary-type actuator 13 of the welding gun 11 may be of an air-driven type or an electrically driven type, any of which is sold in market. In the case of an electrically driven actuator, any of an assembly of an AC servo motor and a reducer and a direct-drive (DD) type servo motor can be used. Since the DD type servo motor does not need a gear and a reducer, noise on a control system due to abrasion is small and little maintenance is required. In the embodiment shown, the DD type servo motor is used.

In FIGS. 1–4, the rotor 17 is rotatably supported on a portion of the stator 16 that is located at a central portion of the actuator. The rotor 17 has a coil portion 18. The rotor 17 is rotated by supplying an electric power to the coil portion 18.

The stator 16 has an axially extending portion 19 extending in a frontward direction and at least one circumferentially extending arm 20 which extends on a circle having a center on the axis 15 of the actuator and is connected to a front end of the axially extending portion 19. Similarly, the rotor 17 has an axially extending portion 21 extending in a frontward direction and at least one circumferentially extending arm 22 which extends on a circle having a center on the axis 15 of the actuator and is connected to a front end of the axially extending portion 21. The arm 20 and the arm 22 extend on the common circle having its center on the axis 15 of the actuator. The axially extending portion 19 and the axially extending portion 21 may be constructed to any length so long as the strength and rigidity thereof are assured. By adopting long axially extending portions, it becomes possible to conduct a weld at a position which is located away from an opening of the workpiece.

The first welding tip 14 is coupled to the circumferential end of the circumferentially extending arm 20 of the stator 16, and the second welding tip 14 is coupled to the circumferential end of the circumferentially extending arm 22 of the rotor 17. One of the welding tip of the stator 16 and the welding tip of the rotor 17 can move toward and away from the other on the circle having its center on the axis 15.

FIGS. 6 and 9 illustrate a case in which a single arm 20 extends in the circumferential direction from the front end of the axially extending portion 19 of the stator 16 and a single arm 22 extends in the circumferential direction from the front end of the axially extending portion 21 of the rotor 17. However, a pair of arms 20 and a pair of arms 22 may be provided.

More particularly, in FIGS. 1–5, two first welding tips 14 are provided and two circumferentially extending arms 20 are provided to the stator 16. The two arms 20 extend in opposite directions and each of the welding tips 14 is coupled to each of the ends of the arms 20, respectively. Similarly, two second welding tips 14 are provided and two circumferentially extending arms 22 are provided to the rotor 17. The two arms 22 extend in opposite directions and each of the welding tips 14 is coupled to each of the ends of the arms 22, respectively.

A rotational angle of the rotor 17 is controllable and adjustable. The rotational angle of the rotor 17 about the axis 15 is controlled by feeding an output signal of an encoder (not shown) provided to the actuator 13 to a robot controller and by controlling the servo motor of the actuator 13 according to the calculation results issued from the robot controller. The rotational angle of the stator 16 also is controllable and adjustable. The rotational angle of the stator 16 about the axis 15 is controlled by controlling the sixth axis of the robot by the robot controller.

Figure 7:
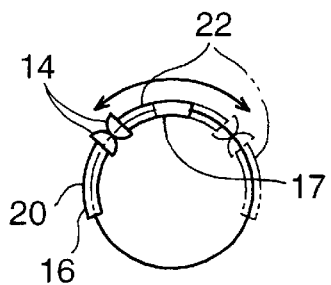
FIG. 7 is a front elevational view of the welding gun of FIG. 6 in a case in which an equalizing function is awarded, illustrating the movement of the arm of the welding gun.

Since the stator 16 and the rotor 17 are controllable in the rotational angles thereof, the opening and closing mode of the welding tips can be selected from a plurality of predetermined modes. More particularly, FIG. 7 illustrates a case in which the rotor 17 is provided with an equalizing function so that even if the contact position of the welding tip 14 with a workpiece changes, the welding gun can follow the change. As a result, a particular equalizer does not need to be provided. Further, FIG. 8 illustrates a case in which first the stator 16 is brought into contact with a workpiece and is stopped at the contact position, then the rotor 17 is rotated to clamp the workpiece. This mode corresponds to the opening and closing mode of the conventional C-type welding gun. Furthermore, FIG. 9 illustrates a case in which both the stator 16 and the rotor 17 are rotated to clamp a workpiece by driving the stator 16 and the rotor 17 by substantially the same amount. This mode corresponds to the opening and closing mode of the conventional X-type welding gun. The opening and closing mode will be selected from these modes according to the configuration of the workpiece.

When the workpiece is clamped between the welding tip of the stator 16 and the welding tip of the rotor 17, an electric current is fed to the welding tips to conduct the weld. In FIGS. 1–4, the welding electricity is fed via a connector 27 to a transformer 24, and from the plus and minus terminal of the transformer 24 via electric paths 25 and 26 to the welding tip 14 of the stator 16 and the welding tip of the rotor 17. The stator 16 includes a bracket 28, and the transformer 24 is supported by the bracket 28. The welding gun is supported by the robot 12 at the bracket 28.

In the electric path of the welding electric current to the welding tips 14, an electric switch (or a terminal) 23 which is turned on and off according to rotation of the rotor 17 relative to the stator 16 is provided. The angle at which the electrical switch 23 is turned on and off is predetermined such that when the welding tip of the rotor 17 and the welding tip of the stator 16 approach to each other and almost clamp a workpiece, the electrical switch 23 is turned on, and when the welding tip of the rotor 17 and the welding tip of the stator 16 move away from each other, the electrical switch 23 is turned off. Therefore, the electrical switch 23 supplies power to the welding tips only when the welding tips 14 are clamping the workpiece.

Operation of the welding apparatus including the welding gun will now be explained with reference to FIG. 12. The control routine of FIG. 12 is installed in the robot controller (which is a computer and controls the operation of the robot). The control routine is entered when the spot-welding is conducted.

In FIG. 12, at step 101, an opening and closing mode of the welding gun 11 is selected. More particularly, the opening and closing mode of the welding gun 11 is selected from the opening and closing mode of the X-type welding gun (where both the welding tip of the stator 16 and the welding tip of the rotor 17 are moved toward and away from a workpiece) and the opening and closing mode of the C-type welding gun (where one of the welding tip of the stator 16 and the welding tip of the rotor 17 is brought into contact with a workpiece and then the other of the welding tip of the stator 16 and the welding tip of the rotor 17 is moved toward the workpiece to clamp the workpiece). When the mode of the X-type welding gun is selected, the routine proceeds to step 102, and when the mode of the C-type welding gun is selected, the routine proceeds to step 106.

At step 102, data of a line along which a mid-point between the two welding tips 14 should be moved (a line connecting spot-welding points) is entered. At step 103, based on the data, a track of the welding gun 11 for moving the welding gun 11 as short as possible without causing an interference with the workpiece from one spot-welding point to the successive spot-welding point is calculated. At step 104, the calculation results are fed to each actuator of the six articulations of the robot 12, and at step 105, the robot 12 is operated to drive the welding gun 11 from one spot-welding point to the successive spot-welding point and to control the attitude of the welding gun 11.

At step 106, a decision is made as to which of the arms 20 and 22 should be selected to be an opening and closing arm. At step 107, a track for moving the welding tip 14 of the stator 16 to the successive spot-welding point as shortly as possible without causing any interference with the workpiece is calculated, and at step 108, the calculation results are fed to the each axis-actuator of the robot 12. Then, at step 109, the robot 12 is operated so that the welding gun 11 is moved to the successive spot-welding point.

When movement of the welding gun 11 to the successive spot-welding point is finished, the routine proceeds to step 110, where a predetermined pressing force of the welding gun at the spot-welding point is entered from the data base. Then, at step 111, start of pressing is instructed to a motor driver. At step 112, the motor driver drives the actuator (servo motor) 13, so that the spot-welding point is pressed. At step 113, whether or not the pressing force is substantially equal to the objective pressing force entered at step 110 is determined, and if not, the routine feeds back to step 112 where the motor's electric current is controlled so that the pressing force becomes substantially equal to the objective pressing force.

While the pressing force is at the objective pressing force, the routine proceeds to step 114, where instruction of conducting welding electric current between the welding tips 14 is issued. At this stage, the electric switch 23 is in an ON state, that is, an electrically conductible state. At step 115, upon issue of instruction of conducting welding electric current at step 114, a timer is turned on so that electricity is conducted for a predetermined period of time during which welding is conducted. After the predetermined time period is determined by the timer, the timer is turned off and the welding at the spot-welding point is completed.

Then, the routine proceeds to step 116, where an opening mode of the welding gun 11 is selected between the opening mode of the X-type welding gun and the opening mode of the C-type welding gun. When the opening mode of X-type welding gun is selected, the routine proceeds to step 117, and when the opening mode of C-type welding gun is selected, the routine proceeds to step 121.

When the routine proceeds to step 117, at step 117, the track for the mid-point between welding tips 14 (a line connecting spot-welding points) is entered. Then, at step 118, a track for moving the welding gun 11 away from the spot-welding point as little as possible without causing any interference with the workpiece is calculated, and at step 119, the calculation results are fed to the each axis-actuator of the robot 12. Then, at step 120, the robot 12 is operated so that the welding gun 11 is moved away from the spot-welding point.

When the routine proceeds to step 121, at step 121, a decision is made as to which of the arms 20 and 22 should be selected to be an opening and closing arm. At step 122, a track for moving the welding tip 14 of the stator 16 away from the spot-welding point as little as possible without causing any interference with the workpiece is calculated, and at step 123, the calculation results are fed to the each axis-actuator of the robot 12. Then, at step 124, the robot 12 is operated so that the welding gun 11 is moved away from the spot-welding point.

Then, the routine proceeds to step 125, and the above-described steps are repeated for welding of the successive spot-welding point.

Technical advantages due to the above-described common portions will now be explained.

Since the actuator 13 of the welding gun 11 is a rotary actuator which rotates the welding tip or tips 14 in the circumferential direction of the welding gun 11 unlike the linear actuator of the conventional welding gun which moves the welding tip or tips on a straight line, the welding tip 14 of the rotor and the welding tip 14 of the stator are opened and closed relative to each other on a common circle. As a result, according to a configuration of the workpiece, the welding tips can be opened and closed without causing an interference with the workpiece, and restrictions on the movement amount of the welding tip or tips 14, and the configuration and dimensions of the welding gun 11 are reduced.

Figure 16:
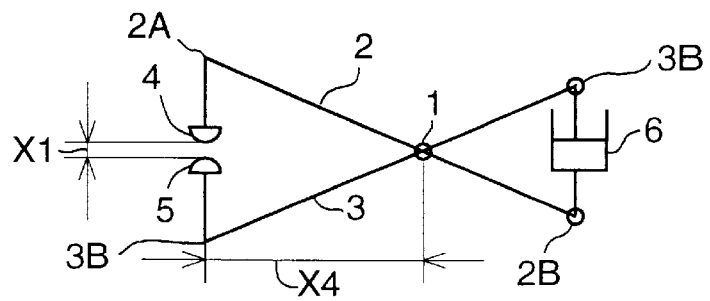
FIG. 16 is a schematic side elevational view of the conventional X-type welding gun.
Figure 17:
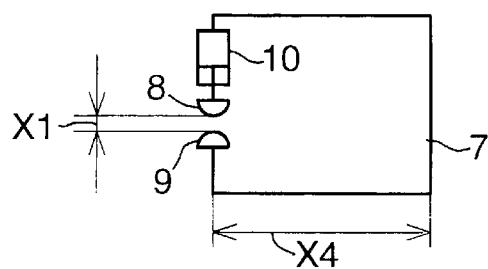
FIG. 17 is a schematic side elevational view of the conventional C-type welding gun.

As will be easily understood from comparison of FIG. 6 (the welding gun according to the present invention) with FIG. 16 (the conventional X-type welding gun) and FIG. 17 (the conventional C-type welding gun), a distance $X_1$ between the welding tip 14 of the rotor and the welding tip 14 of the stator at the open stage of the welding gun and an axial distance $X_4$ between the welding tips 14 and the body of the welding gun according to the present invention can be designed to be larger than those of the conventional welding guns, and the freedom of designing of the welding gun according to the present invention is greater than that of the conventional welding guns. More particularly, the distance $X_1$ between the welding tips 14 can be varied and controlled within the maximum distance $X_2$ which is shown in a mid-portion of FIG. 6 and is equal to a diameter of the circle on which the welding tips are moved. The distance $X_4$ can be any length without increasing a load on the actuator 13 so long as the strength and rigidity of the axially extending portions 19 and 21 are assured. The freedom of the parameters is large with the welding gun 11 according to the present invention.

Figure 13:
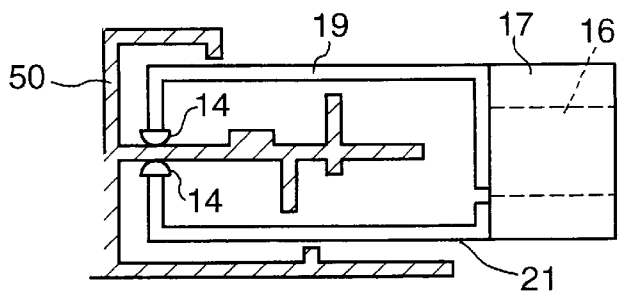
FIG. 13 is a side elevational view of the welding gun according to any embodiment of the present invention, spot-welding a workpiece.

More particularly, FIG. 13 illustrates that the welding gun 11 according to the present invention conducts spot-welding at a position which is located in a recess of the workpiece 50 and far from an opening of the recess. As will be easily understood from FIG. 13, by elongating the axially extending portion 19 of the stator 16 and the axially extending portion 21 of the rotor 17 in the axial direction of the welding gun 11, interference of the welding gun 11 with the workpiece 50 is prevented. Since the welding tips 14 are driven in the rotational direction in clamping and releasing the workpiece 50, even if a portion of the workpiece extends to a position above or beneath and in the vicinity of the spot-welding portion, the axially extending portion 19 of the stator 16 and the axially extending portion 21 of the rotor 17 does not interfere with that portion of the workpiece.

Figure 14:
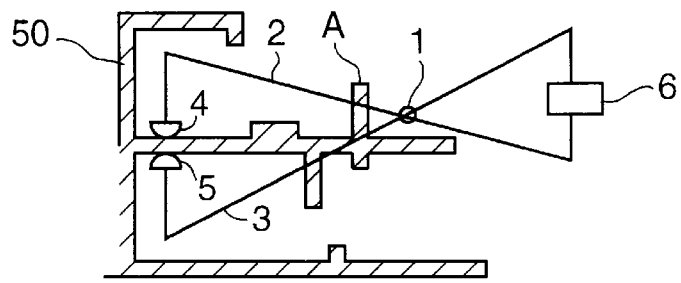
FIG. 14 is a side elevational view of a conventional X-type welding gun, spot-welding a workpiece.
Figure 15:
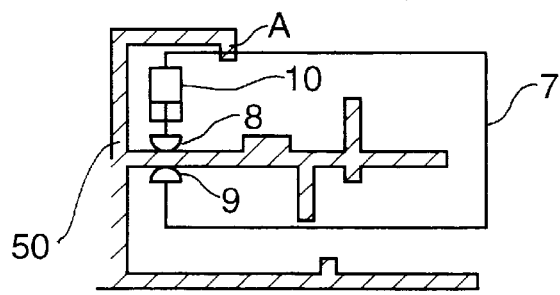
FIG. 15 is a side elevational view of a conventional C-type welding gun, spot-welding a workpiece.

In contrast, FIG. 14 illustrates that the conventional X-type welding gun conducts spot-welding at a position which is located in a recess of the workpiece 50 and far from an opening of the recess. As seen from FIG. 14, the arm 3 interferes with the workpiece and the welding tips 4 and 5 cannot be inserted to the spot-welding portion. Further, FIG. 15 illustrates that the conventional C-type welding gun conducts spot-welding at a position which is located in a recess of the workpiece 50 and far from an opening of the recess. As seen from FIG. 15, even if the welding tips 8 and 9 are inserted to the spot-welding position, the C-shaped frame interferes with the workpiece when the actuator 10 is operated to open the welding gun, so that the welding gun cannot be opened. Therefore, according to the configuration of the workpiece, the freedom of operation and configuration of the welding gun 11 according to the present invention increased compared with that of the conventional welding gun.

Further, even if a plurality of workpieces differ from each other in configuration, by selecting the dimensions of the parameters $X_1$, $X_2$, $X_3$ and $X_4$, the workpieces having different configurations can be dealt with by a single kind of welding gun, and the number of kinds of clamping tools is decreased. For example, in the manufacturing line of spot-welding an automobile main body, in the present invention, only three or four kinds of welding guns are needed, while about twelve kinds of X-type or C-type conventional welding guns were needed. As a result, the number of spare welding guns can be decreased. Further, since the kind of welding gun is little restricted, a problem with the robot and a change in the specification of production can be easily dealt with, so that flexibility in production is assured.

Further, by selecting a direct-drive type electric servo motor (a motor which is not provided with a gear and a speed reducer) for the rotary actuator 13, when some trouble happens, stopping the actuator at the instant position upon happening of the trouble is possible. Further, the drive mechanism for opening and closing the welding tips does not need to be provided with a speed reducer and gears.

By stopping the actuator at the instant position upon the happening of some trouble, safety in working is increased.

By removing a speed reducer and a gear from the drive mechanism for the welding tips, lost motion due to abrasion is removed and noise on the control system due to the lost motion also is decreased. Further, due to the removal of a speed reducer and a gear, the structure of the welding gun becomes simple and compact, so that interference of the welding gun with the workpiece is effectively prevented. Due to the decrease in the noise, inspection of the welding tip adjustment and the system dynamics becomes easy, and reliability for detecting a load becomes high.

In contrast, in the X-type welding gun, in a case where an air cylinder-type actuator is used, due to the two-position operation, emergency stopping is difficult. In the C-type welding gun, both a ball-screw for changing rotation of the servo motor to a linear motion and a speed reducer need to be provided. Abrasion of those members will create noise on the control system, and those members will be accompanied by an increase in weight and size of the welding gun.

In a case where the stator 16 has two circumferentially extending arms 20 extending opposite directions and the rotor 17 has two circumferentially extending arms 22 extending opposite directions, by locating the welding gun at one position and by rotating the rotor 17 (or both the rotor 17 and the stator 16) in normal and reverse directions at that one position, spot-weldings at two positions can be conducted. Since only one spot-welding is possible at one position of the welding gun according to the conventional welding gun, the time period required for spot-welding using the welding gun according to the present invention is shortened to about a half of the time period required for spot-welding using the conventional welding gun. Especially, in the case of welding for two spot-welding points located on opposite sides of a corner, in the conventional spot-welding both movement of the welding gun and change in the attitude of the welding gun are necessary, which needs control of movement of the robot and much time for moving the welding gun from one spot-welding point to the other spot-welding point. However, in the present invention, by locating the welding gun at a mid-point between the two spot-welding points and rotating the rotor 17 (or both the rotor 17 and the stator 16) in the normal and reverse directions, spot-welding at the two spot-welding positions can be easily conducted. As a result, the time period required for the welding is greatly shortened.

Further, by mounting two welding tips on opposite ends of the arm, the life of the welding tip is increased by about twice.

Furthermore, since the electric switch 23 is turned on only when the welding tips 14 clamp the workpiece therebetween, in a case where a hand is held between the welding tips 14, the electric switch 23 is in an OFF state. As a result, safety in working is maintained to be high.

Portions unique to each embodiment of the present invention will now be explained.

A first embodiment of the present invention includes a first case illustrated in FIGS. 1–5 where the circumferentially extending arms 20 and 22 extend in opposite directions from the front ends of the axially extending portions 19 and 21 and a second case illustrated in FIGS. 6–9 where the circumferentially extending arms 20 and 22 extend in only one direction from the front ends of the axially extending portions 19 and 21. In the first case, lengths of the portions of the arm 20 extending opposite directions from the front end of the axially extending portion 19 are equal to each other, and the welding tips coupled to the opposite ends of the arm 20 are the same as each other in configuration. Similarly, in the second case, lengths of the portions of the arm 22 extending opposite directions from the front end of the axially extending portion 21 are equal to each other, and the welding tips coupled to the opposite ends of the arm 22 are the same as each other in configuration.

By making the left and right portions of the arm symmetric with each other, the welding gun is standardized in structure. As a result, even if the arms 20 and 22 and the welding tips 14 are damaged or abraded, the damaged or abraded arm or welding tip can be replaced by another arm or welding tip having the same structure.

With a second embodiment of the present invention, as illustrated in portions of FIGS. 10 and 11, the rotor 17 includes two circumferentially extending arms 22 extending in opposite directions from the front end of the axially extending portion 21, and the two circumferentially extending arms 22 are different from each other in length. Similarly, the stator 16 includes two circumferentially extending arms 20 extending in opposite directions from the front end of the axially extending portion 19, and the two circumferentially extending arms 20 are different from each other in length.

According to the different lengths of the two arms 20 and the different lengths of the two arms 22, two kinds of spot-weldings can be conducted by a single welding gun at a single welding-gun position. As a result, the number of kinds of welding guns necessary for conducting spot-welding can be decreased.

With a third embodiment of the present invention, as illustrated in another portions of FIGS. 10 and 11, the rotor 17 includes two circumferentially extending arms 22 extending in opposite directions from the front end of the axially extending portion 21. Welding tips 14 are coupled to ends of the two circumferentially extending arms 22. The welding tips 14 coupled to the ends of the two circumferentially extending arms 22 are different from each other in configuration. Similarly, the stator 16 includes two circumferentially extending arms 20 extending in opposite directions from the front end of the axially extending portion 19. Welding tips 14 are coupled to ends of the two circumferentially extending arms 20. The welding tips 14 coupled to the ends of the two circumferentially extending arms 20 are different from each other in configuration.

According to the different configurations of the welding tips 14 coupled to the two arms 20 and the different configurations of the welding tips 14 coupled to the two arms 22, two kinds of spot-weldings can be conducted by a single welding gun at a single welding gun position. As a result, the number of kinds of welding guns necessary for conducting spot-welding can be decreased.

The different configurations of the welding tips 14 and the different lengths of the circumferentially extending arms 20 and 22 may be combined, as illustrated in FIGS. 10 and 11.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A welding gun comprising:
   an actuator having an axis, said actuator including a stator and a rotor rotatable about said axis of said actuator relative to said stator; and
   at least one first welding tip supported by said stator and at least one second welding tip supported by said rotor, said first welding tip and said second welding tip being arranged in a circular path having a center on said axis of said actuator, said second welding tip being movable relative to said first welding tip in said circular path.

2. The welding gun according to clam 1, wherein said welding gun is coupled to a robot so that said stator is driven by said robot to rotate about said axis of said actuator.

3. The welding gun according to claim 1, wherein each of said stator and said rotor is adjustable in rotational angle about said axis of said actuator.

4. The welding gun according to claim 1, further comprising an electric circuit for welding, electric current electrically connected to said first welding tip and said second welding tip, said electric circuit including an electric switch that is turned on and off according to rotation of said rotor relative to said stator.

5. The welding gun according to claim 1, wherein said stator includes at least one extending arm having a semi-circular end, said at least one first welding tip being coupled to said semi-circular end of said at least one extending arm of said stator, respectively, and wherein said rotor includes at least one extending arm having a semi-circular end, said at least one second welding tip being coupled to said semi-circular end of said at least one extending arm of said rotor, respectively.

6. The welding gun according to claim 5, wherein two said first welding tips and two said extending arms of said stator are provided, said two extending arms of said stator extending in opposite directions to each other and including semi-circular ends, each of said first two welding tips being coupled to each of said semi-circular ends of said two extending arms of said stator, respectively, and wherein two said second welding tips and two said extending arms of said rotor are provided, said two extending arms of said rotor extending in opposite directions to each other and including semi-circular ends, each of said two second welding tips being coupled to each of said semi-circular ends of said two extending arms of said rotor, respectively.

7. The welding gun according to claim 6, wherein said two extending arms of said stator are different from each other in length and said two extending arms of said rotor are different from each other in length.

8. The welding gun according to claim 6, wherein said two first welding tips are different from each other in configuration, and said two second welding tips are different from each other in configuration.

* * * * *